United States Patent
Ambrose et al.

(10) Patent No.: US 11,021,410 B2
(45) Date of Patent: Jun. 1, 2021

(54) LAYER-WISE AGGLOMERATED UREA GRANULES

(71) Applicant: Purdue Research Foundation, West Lafayette, IN (US)

(72) Inventors: Rose Prabin Kingsly Ambrose, West Lafayette, IN (US); Carl R Wassgren, Jr., West Lafayette, IN (US); Dhananjay Pai, West Lafayette, IN (US); Yanjie Chen, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/704,342

(22) Filed: Dec. 5, 2019

(65) Prior Publication Data
US 2020/0181035 A1 Jun. 11, 2020

Related U.S. Application Data

(60) Provisional application No. 62/777,261, filed on Dec. 10, 2018.

(51) Int. Cl.
*C05C 9/00* (2006.01)
*C05G 5/30* (2020.01)

(52) U.S. Cl.
CPC ............... *C05C 9/005* (2013.01); *C05G 5/37* (2020.02)

(58) Field of Classification Search
CPC .. C05C 9/005; C05G 3/08; C05G 5/37; A61K 9/14
See application file for complete search history.

(56) References Cited

U.S. PATENT DOCUMENTS

| | | | | |
|---|---|---|---|---|
| 5,238,480 | A * | 8/1993 | Rehberg | C05C 9/00 71/28 |
| 6,413,548 | B1 * | 7/2002 | Hamer | A61K 9/14 424/489 |
| 2011/0314882 | A1 * | 12/2011 | Palmer | C05F 3/00 |
| 2018/0044254 | A1 | 2/2018 | Gabrielson et al. | |

(Continued)

FOREIGN PATENT DOCUMENTS

CN 203451397 U 2/2014

OTHER PUBLICATIONS

Lu D.R., Xiao, C.M., Xu, S.J.,"Starch-based Completely Biodegradable Polymer Materials", 2009, Polymer Letters, vol. 3, No. 6, p. 371 (Year: 2009).*

(Continued)

*Primary Examiner* — Jennifer A Smith
*Assistant Examiner* — Amanda Garley
(74) *Attorney, Agent, or Firm* — Purdue Research Foundation; Zhigang Rao (57) ABSTRACT

The present disclosure generally relates to layer-wise agglomerated controlled release granular urea composition and methods of making and using the layer-wise agglomerated controlled release granular urea composition. In a particular composition, the water-soluble plant nutrient comprises urea, the binding material for the core comprises corn starch, the hydrogel for the coating layer comprises corn starch hydrogel, the core has a thickness of 2.5-3.5 mm and a closed porosity of 0.05-3%, and the coating layer has a thickness of 1.35-1.5 mm and a closed porosity of 0.1-5%.

8 Claims, 9 Drawing Sheets

(56) References Cited

U.S. PATENT DOCUMENTS

2018/0028519 A1* 7/2018 Kanagalingam ......... C05G 3/08
2018/0339951 A1* 12/2018 McLaughlin ........ C05G 3/0041
2020/0283601 A1* 9/2020 Guerrini ................ C08L 1/286

OTHER PUBLICATIONS

Modric, J. "Dextrins—Nutrients Review", accessed from http://www.nutrientsreview.com/carbs/polysaccharides-dextrins.html (Year: 2015).*
Liang et al ("Preparation and Properties of Coated Nitrogen Fertilizer with Slow Release and Water Retention"), 2006, Journal of Agricultural and Food Chemistry, 54, 1392-1398, doi:10.1021/jf052582f (Year: 2006).*
Böhlenius et al ("Effects of Direct Application of Fertilizers and Hydrogel on the Establishment of Poplar Cuttings"), 2014, Forests, 5, 2967-2979, doi:10.3390/f5122967 (Year: 2014).*

* cited by examiner

FIG. 9

LAYER-WISE AGGLOMERATED UREA GRANULES

CROSS-REFERENCE TO RELATED APPLICATION

This application claims the benefits of U.S. Provisional Application Ser. No. 62/777,261, filed Dec. 10, 2018, the contents of which are incorporated herein entirely.

TECHNICAL FIELD

The present disclosure generally relates to layer-wise agglomerated controlled release granular urea composition and methods of making and using the layer-wise agglomerated controlled release granular urea composition.

BACKGROUND

This section introduces aspects that may help facilitate a better understanding of the disclosure. Accordingly, these statements are to be read in this light and are not to be understood as admissions about what is or is not prior art.

Fertilizers are widely used to release the nutrients necessary for plants to grow better. Of all fertilizers, urea is the most widely used, mainly because of its high nitrogen content (up to 46%) and low price. However, around 70% of applied urea is reported to be lost in regions with high, intermittent precipitation. The loss of urea to leaching leads not only to major economic loss, but also to severe environmental pollution. To mitigate this problem, an effective solution is to develop slow-release urea fertilizers. Adding coating material to fertilizer granules is one useful way of achieving this. There are many different materials available that can be used for coating, such as sulfur, and various types of polymers, including, but not limited to; low density polyethylene (LDPE), ethyleneacrylic acid copolymers, and polyurethane. Meanwhile, this coating method is used not only for urea fertilizer, but it is also widely used to enhance the performance of NPK compound fertilizers. Some studies have focused on the dissolution behavior of fertilizer samples and the properties of coating films. Coated urea does extend the release time and increase the efficiency of nutrient use; however, coated urea use is limited to developed countries because of its high price. In order to create a cheaper slow-release urea fertilizer, many different biodegradable materials, such as starch and hydrogel, have been added to urea granules to extend the release time.

Therefore, there remains a need to develop environmentally preferable and more economically feasible controlled release urea fertilizer.

SUMMARY

The present disclosure generally relates to layer-wise agglomerated controlled release granular urea composition and methods of making and using the layer-wise agglomerated controlled release granular urea composition.

In one embodiment, the present disclosure provides a controlled release fertilizer granular composition, wherein the controlled release fertilizer granular composition comprises:
    a core comprising a water-soluble plant nutrient and a binding material to bind the water-soluble plant nutrient; and
    a coating layer comprising the water-soluble plant nutrient and a hydrogel,
wherein the closed porosity of the coating layer is higher than the closed porosity of the core.

BRIEF DESCRIPTION OF THE DRAWINGS

FIG. 1 shows wheat growth staging and nitrogen use. See Ciampitti, I., Elmore, R. & Lauer, J. (2016). MF3305S. Kansas State University Agricultural Experiment Station and Cooperative Extension Service

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure the term "porosity" refers to the measure of the void fraction in a material. Voids can either be "closed" and inaccessible or "open" and connected to other voids and then to the exterior of the material. The porosity used in the present disclosure is mainly the closed porosity, which is related to voids that are "closed" and inaccessible to other voids and are not connected to the exterior of the material.

Figure 1:
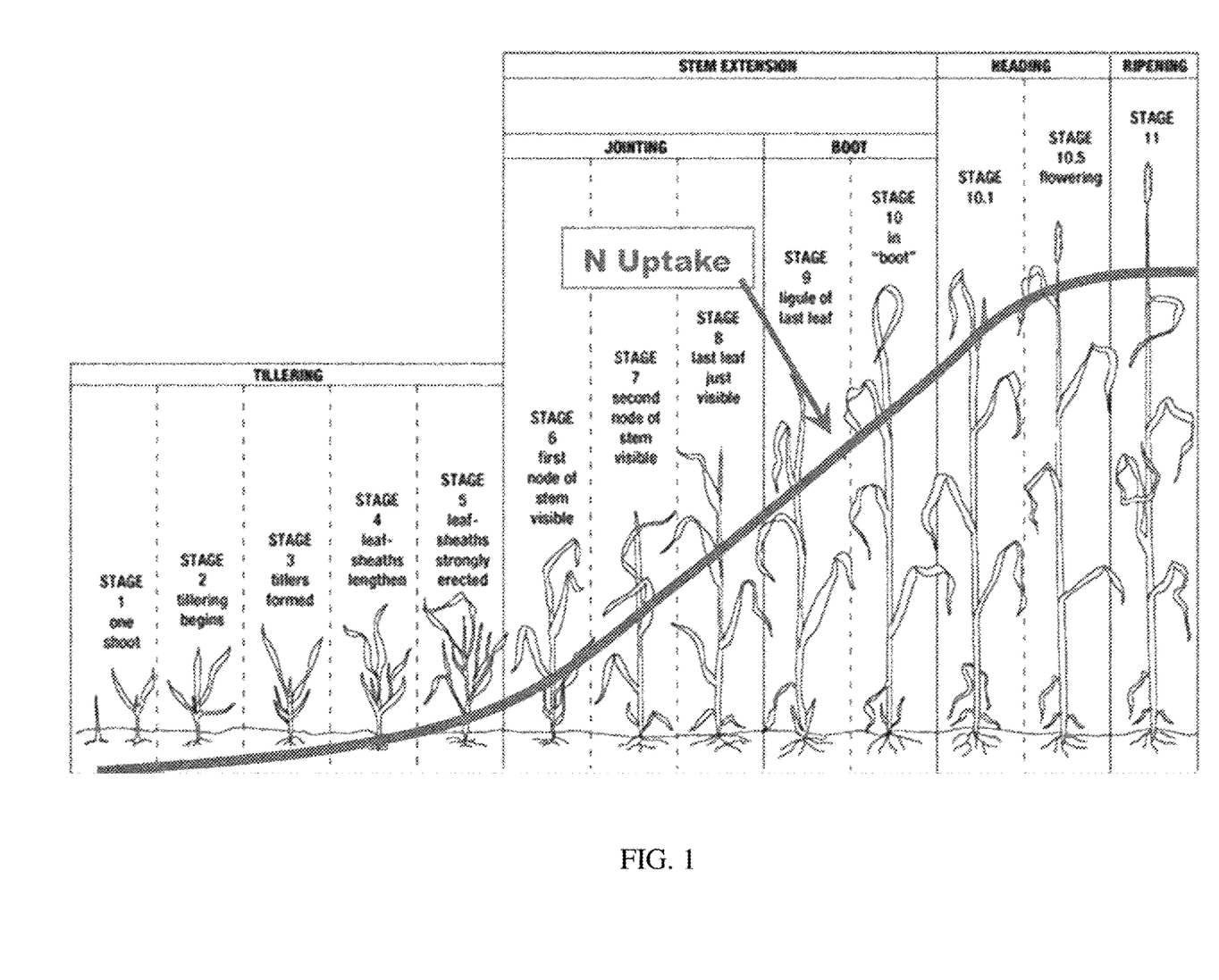

Fertilizer can help to increase crop yields. However, some environmental hazards may also be caused by the use of large amounts of fertilizer. There are several ways to increase the nutrients, and especially the efficient use of nitrogen, including: a) by using controlled-release fertilizers (CRFs) or slow-release fertilizers (SRFs); b) by placing urea granules deeper in the ground; c) by using inhibitors to reduce nitrate leaching, denitrification and ammonia volatilization in urea. Using CRF or SRF is the better way to improve nutrient use efficiency while reducing environmental hazards. As shown in FIG. 1, the nitrogen needed during wheat growth is not constant, so nutrient use efficiency can be increased by extending the nutrient release time. The use of SRF/CRF is only about 0.15% of the total use of fertilizers and they are mainly used in developed countries, such as United States, Canada, Japan, and European countries.

Although a variety of different materials and processing methods have been developed in the production of SRF/CRF, there is still a strong need with the aim of making fertilizers that are more environmentally friendly, with longer dissolution times and better handling properties. The present disclosure therefore provides a novel two-layer urea granule with a controlled dissolution rate. More importantly, the dissolution pattern of this granule as disclosed in this disclosure was similar to the crop demand curve FIG. 1.

In one embodiment, the present disclosure provides a controlled release fertilizer granular composition, wherein the controlled release fertilizer granular composition comprises:
 a core comprising a water-soluble plant nutrient and a binding material to bind the water-soluble plant nutrient; and
 a coating layer comprising the water-soluble plant nutrient and a hydrogel,
 wherein the closed porosity of the coating layer is higher than the closed porosity of the core.

In one embodiment, the present disclosure provides a controlled release fertilizer granular composition, wherein the core has a diameter of 1.5-4.0 mm, and a closed porosity of 0.05-3%, wherein the coating layer has a thickness of 0.5-2.0 mm, and a closed porosity of 0.1-5%.

In one embodiment, the present disclosure provides a controlled release fertilizer granular composition, wherein the water-soluble plant nutrient comprises urea. In one aspect, the water-soluble plant nutrient is substantially urea.

In one embodiment, the present disclosure provides a controlled release fertilizer granular composition, wherein the binding material and the hydrogel comprise naturally occurring materials or derivatives made from naturally occurring materials.

In one embodiment, the present disclosure provides a controlled release fertilizer granular composition, wherein the binding material is starch, celluloses, gum, or any combination thereof.

In one embodiment, the present disclosure provides a controlled release fertilizer granular composition, wherein the binding material is corn starch, potato starch, tapioca starch, microcrystalline cellulose, hydroxypropylmethyl cellulose, guar gum, gum Arabic, or any combination thereof.

In one embodiment, the present disclosure provides a controlled release fertilizer granular composition, wherein the hydrogel is starch-based hydrogel, cellulose-based hydrogel, plant and/or animal protein based hydrogel, or any combination thereof.

In one embodiment, the present disclosure provides a controlled release fertilizer granular composition, wherein the core comprises 1-15 wt. % of binding material and 85-99 wt. % of water-soluble plant nutrient, the coating layer comprised 1-5 wt. % of hydrogel.

In one embodiment, the present disclosure provides a controlled release fertilizer granular composition, wherein the fertilizer granular composition is capable of releasing the needed amount of nutrients to a plant based on plant growth stages.

In one embodiment, the present disclosure provides a controlled release fertilizer granular composition, wherein the water-soluble plant nutrient comprises urea, the binding material for the core comprises corn starch, the hydrogel for the coating layer is corn starch hydrogel, the core has a thickness of 1.5-4.0 mm, the coating layer has a thickness of 0.5-2.0 mm.

Materials and Methods

Figure 2:
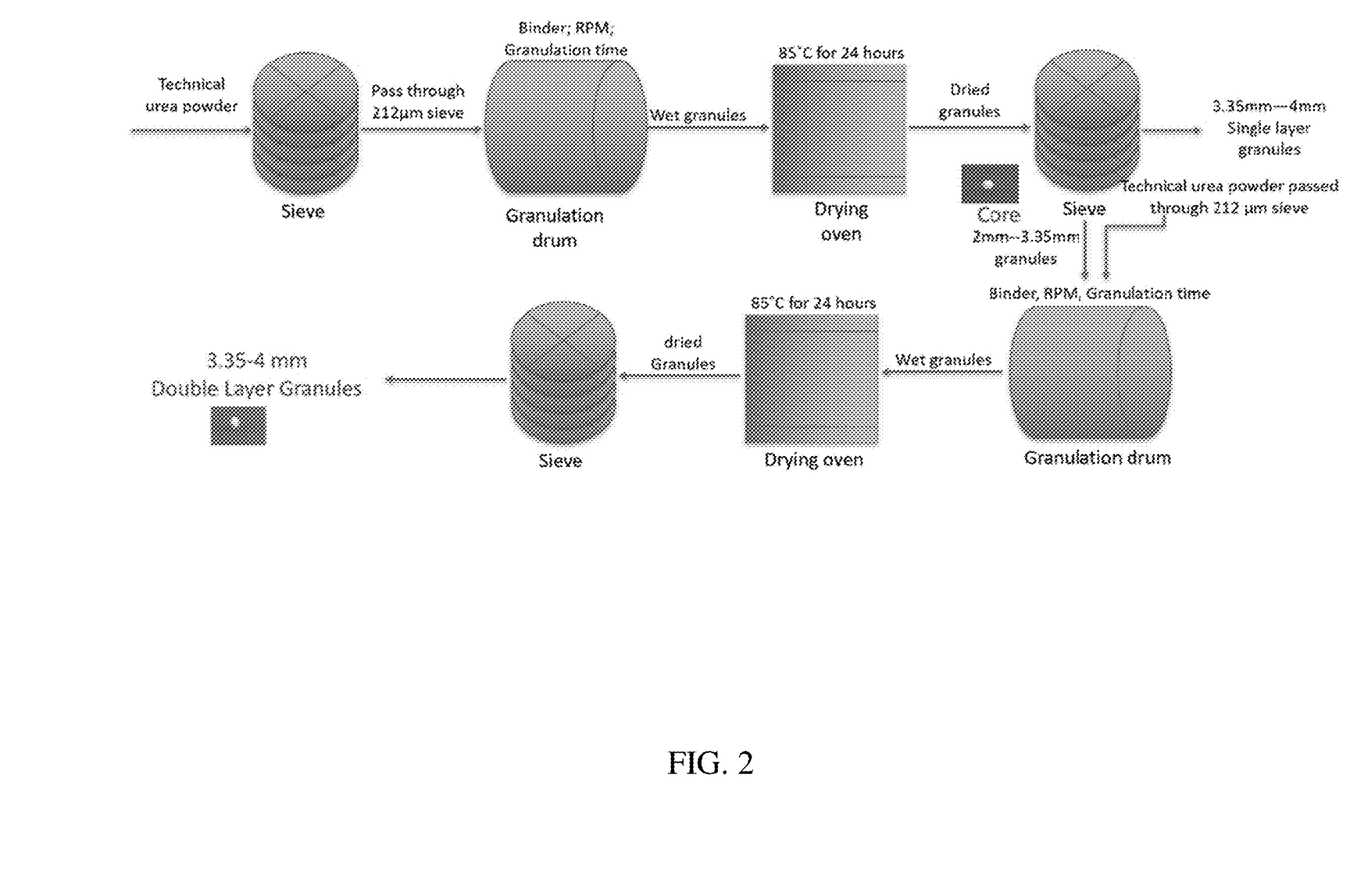
FIG. 2 shows experimental procedure used in the manufacture of double-layered urea granules.

The procedure used in this study is given in FIG. 2. This process was formalized after many preliminary trails which results are given in appendix. Technical urea powder that passed through a 212 µm sieve was used for manufacturing granular urea. The urea powder was loaded in a stainless-steel drum (dimensions: 6" diameter, 4" height) and mixed with 5% corn starch. Then, 11% distilled water was sprayed into the drum. The granules were then dried for 24 h at 85° C. Dried granules were sieved and the granules within the size range of 2-3.35 mm were used as the core and used for the second layer agglomeration. For the second layer, binders and technical urea powder were premixed and loaded in the drum following the same procedure as core granules. The wet granules were then dried and sieved. The granules within a size range of 3.35-4 mm were used for characterization studies. This size range was selected since this compares with the average size of market urea granules. The variables tested in this study were: binder type, granulation time (for core and second layer), and drum rpm (for core and second layer). The list of experimental trials used in this study is provided in Table 1.

TABLE 1

Experimental trials

| Sample/Parameters | Trials |
|---|---|
| Urea | Technical urea powder (≤212 µm) |
| Temperature | 22° C. |
| Liquid solid ratio | 11% |
| Binders | Corn starch powder (core) |
|  | PEG 4000 (second layer) |
|  | Corn starch hydrogel (second layer) |
|  | Control (without binder - second layer) |
| Granulation time (core; min) | 15 (7; 14 rpm) |
|  | 20 (7 rpm) |
|  | 25 (7; 14 rpm) |
|  | 30 (7 rpm) |
|  | 35 (7 rpm) |
| Granulation time (second layer; min) core - 15 min; 14 rpm | 7 (7; 14 rpm) |

Characterization of Two Layered Urea Granules

Density and Porosity Analysis

The envelope and apparent density of all granule samples were measured using AccuPyc II 1340 Gas Pycnometer (Micromeritics, Norcross, Ga.) and GeoPyc 1360 Envelop and T.A.P. Density Analyzer (Micromeritics, Norcross, Ga.). Around 0.5 g of samples were put into a 1 cm$^3$ chamber for apparent density measurement, and the same samples were put in a chamber for envelope density measurement.

Fracture Pressure

The fracture force and fracture pressure of each sample granule was measured using MTS Criterion (MTS System Corporation, Eden Prairie, Minn.). Those sample granules with an "ideal" spherical shape were selected to perform the compression tests. Fifteen replicates were measured for each type of granule sample.

Internal Structure Analysis

All sample granules were scanned at 3.5 µm using a Skyscan X-ray micro CT (Micro Photonics Inc., Allentown, Pa.). All data, including number of pores, area and volume of pores, and porosity were recorded using Skyscan software, including Skyscan CTvox, CTAn and CTvol. During scanning and analyzing, no filter was used; frame averaging setting is 4, random movement setting is 10, and rotation step (deg) setting is 0.200. Select granules from all fertilizer samples was scanned using a Skyscan X-ray micro CT (Micro Photonics Inc., Allentown, Pa.) at 3.5 μm scan resolution. All image analysis, which included the number of pores, area, and volume of pores and porosity, were performed using the Skyscan software suite that included Skyscan CTvox, CTAn, and CTvol (Micro Photonics Inc., Allentown, Pa.). Frame averaging was set at 4 and random movement was set at 10. To obtain the porosity, after the samples were scanned, the images were reconstructed. The porosity was obtained from the reconstructed images, following volume of interest (VOI) determination, region of interest (ROI) determination, ROI cropping, binary image conversion, thresholding, white and black despeckle, and then 3D analysis.

Thermal Analysis

Granule sample thermal properties were analyzed using a TGA 4000 (PerkinElmer, Waltham, Mass.). All samples were heated from 35° C. to 700° C. at a heating rate of 10.00° C./min with a nitrogen flow rate at 20.00 mL min$^{-1}$. Thermogravimetry (TG) analysis was performed using the Thermo Gravimetric Analyzer 4000 (PerkinElmer, Waltham, Mass.). The data recording frequency was set at every 10 s and the raw data includes sample temperature and sample weight. Then the raw data was analyzed and derivative thermogravimetry curves were obtained using Origin-Pro 2015(OriginLab, Massachusetts) with "50 pts SG smooth" settings.

Granulation Yield

The granulation yield was calculated using the equation below:

For Core:

$$\text{Yield, \%} = \frac{\text{mass of granule in 2 mm} - 3.35 \text{ mm size range}}{\text{total sample mass used for granulation}} \times 100\%$$

For Double Layer:

$$\text{Yield, \%} = \frac{\text{mass of granule in 3.35 mm} - 4 \text{ mm size range}}{\text{total sample mass used for two layer granulation}} \times 100\%$$

Dissolution Rate Measurement

The dissolution behavior of all granulated samples was first visually observed to select the granules with better performance. Then, the dissolution of granules manufactured at optimum granulation conditions was measured using UV-Vis spectrophotometry. To visually observe the dissolution rate, the mass of the single granule was recorded and then the sample was placed in 200 mL of distilled water. The time at which the granule had fully dissolved was noted down. Five replicates were performed for each sample. The dissolution behavior of market urea and ESN samples were also measured to compare the performance with two-layer granules. The dissolution rate was measured using Cary 60 UV vis spectrometer (Agilent, Clara, Calif.) following these steps:

a. 200 mg urea granules were placed on a 250-mesh stainless steel coffee maker filter sieve with a thickness of 0.4 mm, outer diameter of 61.5 mm, and inner diameter of 51.5 mm.

b. The sieve was glued with three long nails and placed into a 200 mL beaker. For better mixing of the dissolved nutrients a magnetic stirrer (75 rpm) was placed at the bottom of the beaker.

c. To prepare sample solution for the UV Vis spectrophotometer, 10 mL of urea sample solution was mixed with 10 mL of 20 g/L Paradimethylaminobenzaldehyde (PDAB) ethanol solution, and then 4 mL of 2 mol/L $H_2SO_4$ and 1 mL of distilled water were added together to reach a 25 mL solution for UV measurement.

d. The peak wavelength chosen for two-layer granules manufactured using technical urea was 421 nm. In order to get the relationship between the urea concentration and the UV absorbancy, multiple urea solutions were prepared to test under UV. More specifically, 200, 400, 600, 800, 1000 mL/L solution were used.

e. During the measurement of urea and ESN dissolution, 10 ml sample solutions were drawn every 2 minute up to 8 and 10 min., respectively.

f. Then sample solution was mixed with 10 ml of 20 g/L Paradimethylaminobenzaldehyde (PDAB) ethanol solution, and then 4 mL of 2 mol/L H2SO4 and 1 mL of distilled water were added together to reach a 25 mL solution for UV measurement.

Statistical Analysis

All density measurements were performed in triplicate and the fracture pressure measurement were performed in 15 replicates. Statistical analysis was conducted using SAS software (SAS Institute, Cary, N.C.). Significant difference for comparison was determined based ANOVA Tukey's Studentized Range (HSD) Test ($\alpha=0.05$).

Results and Discussion

Granulation Yield:

With the increase in the total revolution, the yield increases till a revolution of 210 and then decreased. As the yield indicates the amount of granules with a size range of 2-3.35 mm, the results can't predict a clear relationship between revolution and yield at different granulation sizes. The kinetics in determining fertilizer granule size distribution was not completely established.

Fracture Pressure and Dissolution

Figure 3:
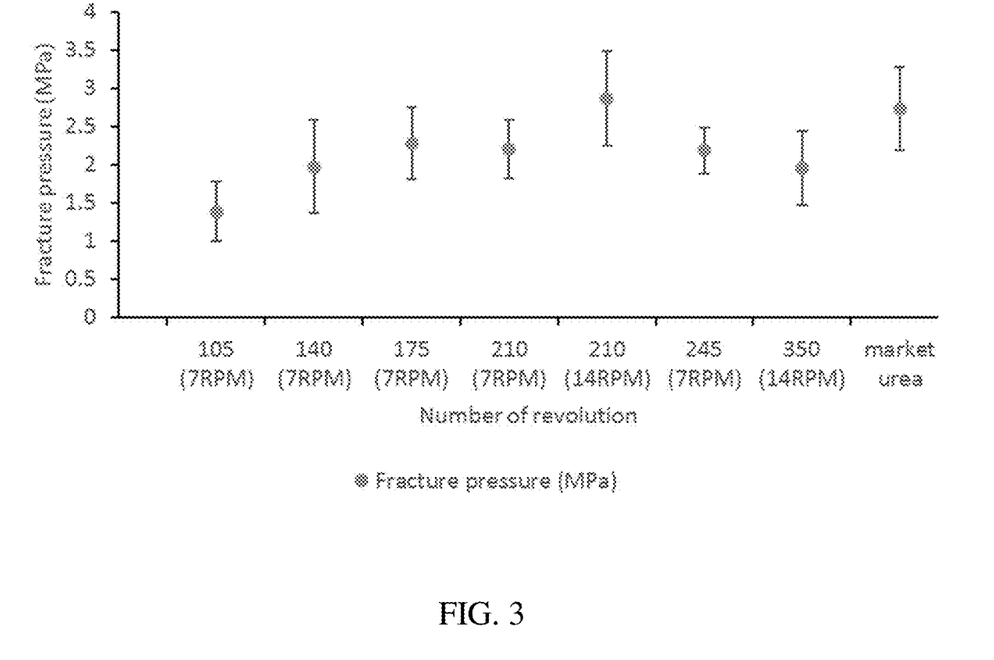
FIG. 3 shows fracture pressure of core granules with a size of 2 mm-3.35 mm.

It was found in FIG. 3 that the granule fracture pressure increased as the number of revolution increased till the revolution of 210, and then with more number of revolutions, the fracture pressure decreased. The granule hardness increased with the increase in granulation time, mainly because the increased granulation time lead to an increase in particle densification. The granule saturation was reached because the pore space reduction occurred by consolidation rather than the filling of the pores. The fracture pressure showed a negative correlation with dissolution, which may because of the reduced pore space. Granulation speed showed significant influence on the granule fracture pressure. The fracture pressure of the granule manufactured with 210 revolution (14 rpm) is 23% higher than the granule fracture pressure produced at 210 revolution (7 rpm), indicating higher granulation speed can increase the granule fracture pressure. As this single layer granule will be working as the core for double layers, so higher fracture pressure is preferred. Based on the results in FIG. 3, the granule manufactured at 14 rpm with 15-minute granulation time was selected as the core for double layer.

Figure 4:
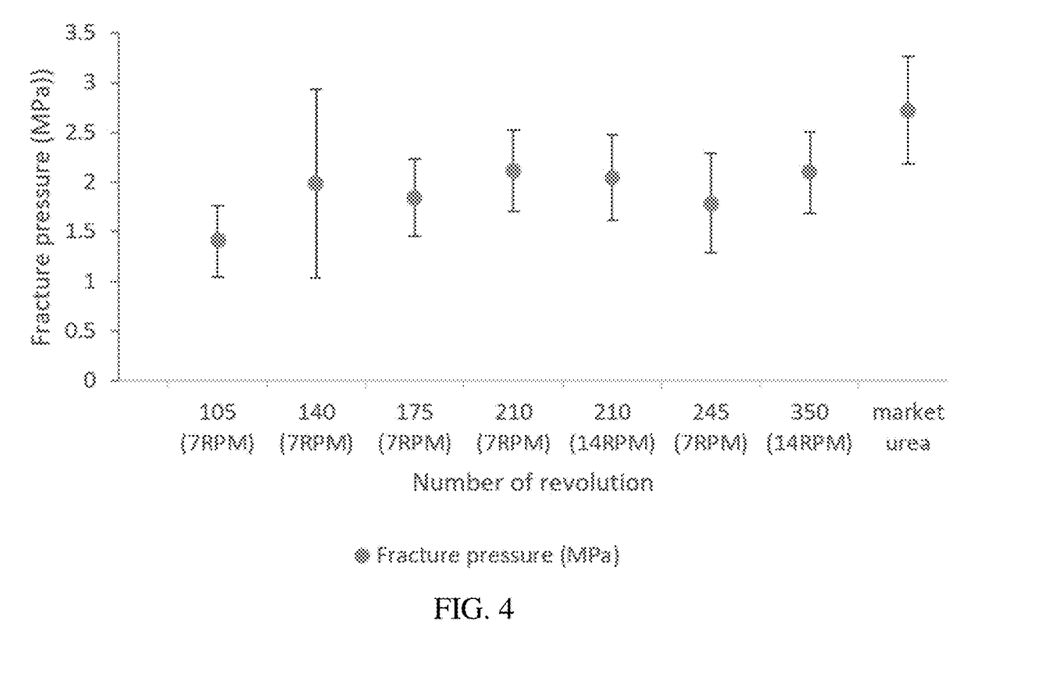
FIG. 4 shows fracture pressure of core granules within the size of 3.35 mm-4 mm.
Figure 5:
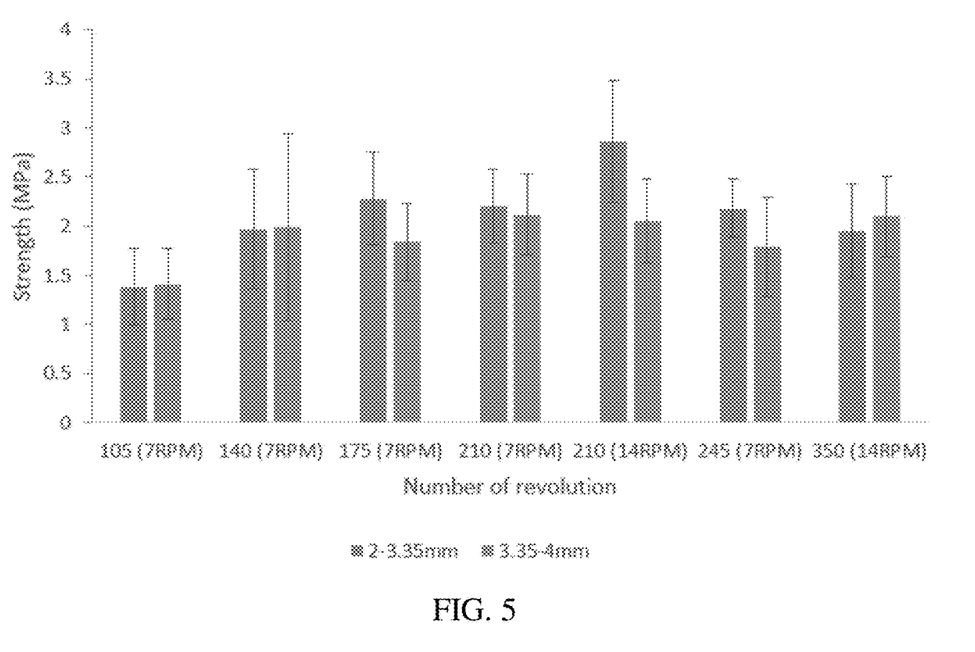
FIG. 5 shows fracture pressure of granules of 2-3.35 mm and 3.35-4 mm.

When comparing FIG. 3. with FIG. 4, it can be concluded that granule fracture pressure is a function of the number of revolution. Higher fracture pressure can be reached no matter for large or small granules, with increased number of revolution. However, from FIG. 5, it also can be seen that the higher fracture pressure can be found for small granules. This may be because of the reason that different liquid/solid ratio and granulation speed, or due to the method of binder application.

Figure 6:
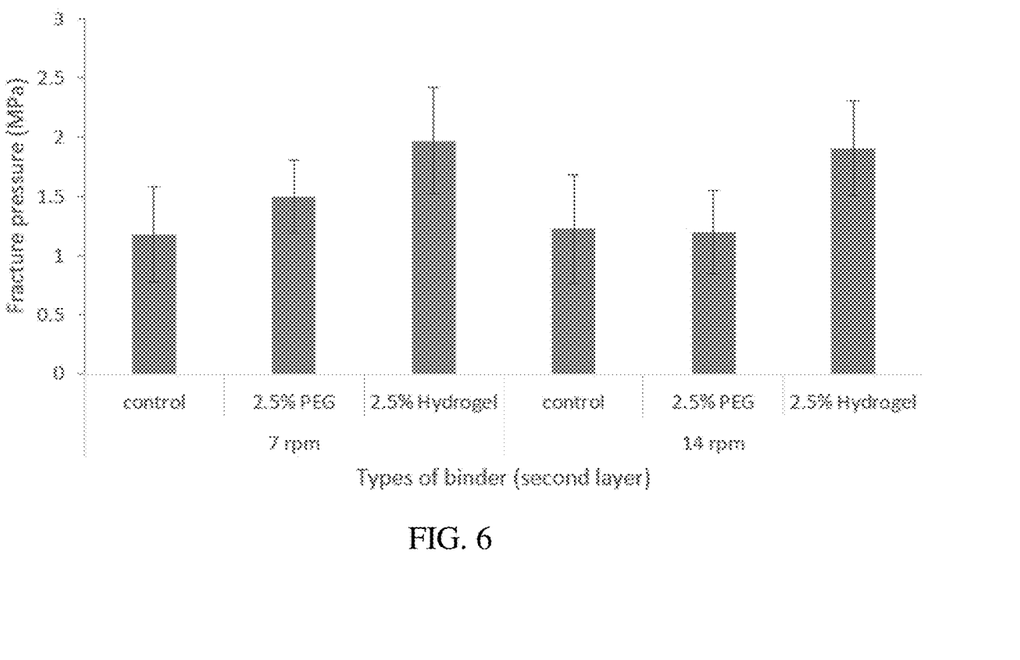
FIG. 6 shows fracture pressure of double layer granules.

The binder amount, binder solution viscosity and binder distribution have significant effect on the granule physical properties. Lower moisture content and lower binder viscosity tend to reduce the equilibrium size distribution granulation time. The fracture pressure and dissolution rate results of double layer granules are shown in FIG. 6. In FIG. 6, control indicates that the second layer is made with urea powder without addition of binder. The 2.5% PEG and 2.5% corn starch hydrogel indicate the different binders used in the second layer. It is clear that for both 7 rpm and 14 rpm, the second layer with hydrogel shows the highest fracture pressure. In terms of dissolution rate, the hydrogel binder had the lowest dissolution rate. Overall, the 7 rpm granulation speed with 2.5% corn starch hydrogel had the best performance regarding the fracture pressure and dissolution rate.

Figure 7:
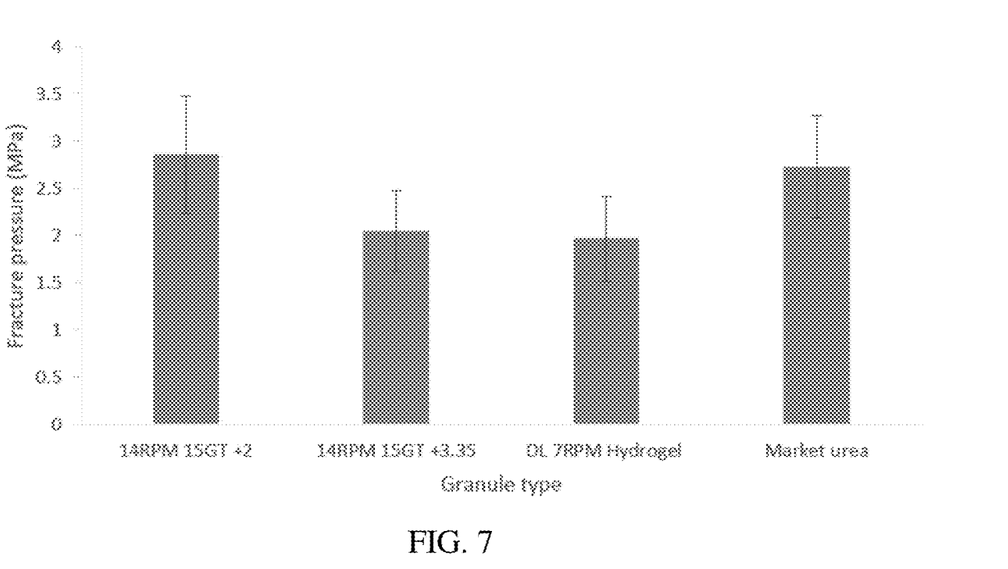
FIG. 7 shows fracture pressure of selected granules.

The fracture pressure of two-layered granule with hydrogel as the binder was comparable with market urea (FIG. 7). For the other two types of granules, the fracture pressures were roughly 25% lower than the marker urea granules. Meanwhile, the dissolution rate of the double layer core is about 16% of the market urea. For the single layer granule with a size of 3.35-4 mm, the fracture pressure becomes lower and dissolution rate becomes larger when comparing with the single layer granule with a size of 2-3.35 mm. When comparing the core and the double layer using the core, it is clear that the fracture pressure became 30% lower and the dissolution rate became almost 20% higher. However, for all the two-layer granules, the dissolution rates are 80% lower than the market urea, which means the two-layer granules release nutrients in a controlled manner.

Density and Internal Porosity

The target is to make a two layer granule that is similar in size and fracture pressure as market urea but with a much lower dissolution rate. The normal market urea granule, ESN, core, and three types of double layer granules' density and internal porosity are listed in FIG. 8 and Table 2.

TABLE 2

Density of two-layers granules

| Sample | Envelope density (Kg/m$^3$) | Apparent density (Kg/m$^3$) |
|---|---|---|
| Urea | 1.22 ± 0.02$^a$ | 1.27 ± 0.01$^b$ |
| ESN | 1.26 ± 0.03$^a$ | 1.27 ± 0.00$^b$ |
| DL Control | 0.86 ± 0.01$^b$ | 1.34 ± 0.00$^a$ |
| DL Hydrogel | 0.86 ± 0.03$^b$ | 1.35 ± 0.01$^a$ |
| DL PEG | 0.85 ± 0.03$^b$ | 1.35 ± 0.01$^a$ |

For all the two layer granules, there is no statistically significant difference in the envelope and apparent density. However, the core did had a relatively lower internal porosity than the other three types of double layer granules, which is mainly because of the low density of the second layer. Among the three types of double layer granules, the one with starch hydrogel did show relatively low internal porosity. Overall, the two-layer granules of the present disclosure showed about 30% lower apparent density and 10% higher envelope density than the market urea and ESN.

Dissolution Behavior of Two-Layer Granules

Figure 8:
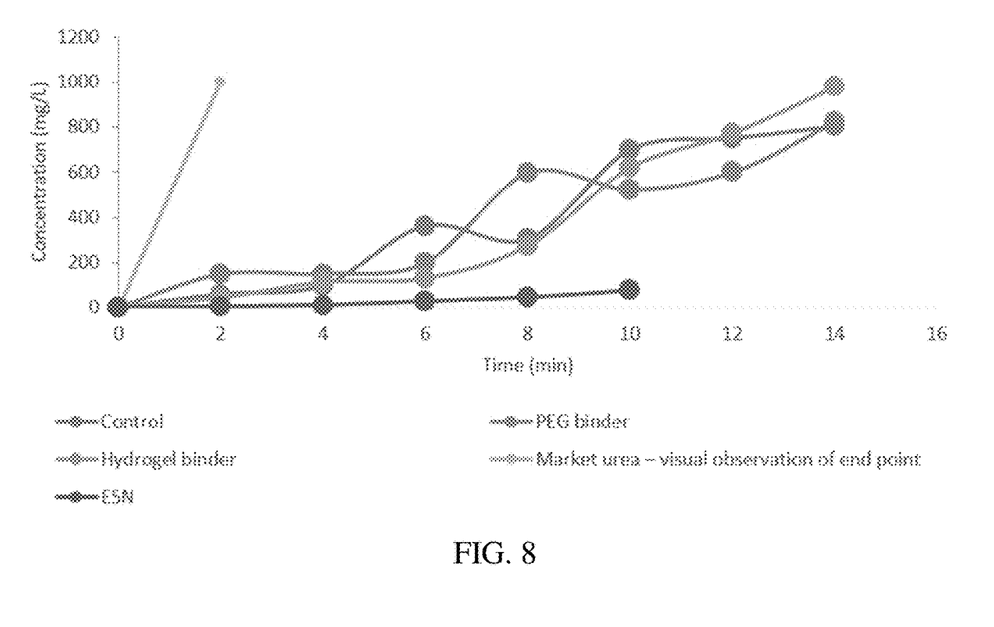
FIG. 8 shows two-layer granule dissolution rate measured using UV-Vis spectrophotometer.

The dissolution rate results are shown in FIG. 8. It is evident that the ESN shows a very slow dissolution rate with progression of time. On the contrary, the market urea shows a fast dissolution rate. For all the three types of two-layer double layer granules, the dissolution rate was within the range between market urea and ESN. The change in dissolution rate pattern for two-layer granules may be because of the sample solution volume accuracy error or due to the sample's dissolution properties. The granule with starch hydrogel binder had a uniform pattern with low fluctuation. Where in the dissolution increased slowly at the beginning and then increased rapidly, that indicated the nutrient release rate is slow at the beginning and then becomes higher with increase in time. The dissolution pattern of this granule was similar to the crop demand curve (FIG. 1). When comparing FIG. 1 and FIG. 8, it is clear that the market urea granules dissolve too quickly, while the ESN dissolve too slowly to meet the crop requirement. The two-layer granules manufactured in this work fit the crop demand curve much better than the commercial fertilizers, which means that the granule will release nutrient matching crop needs.

Figure 9:
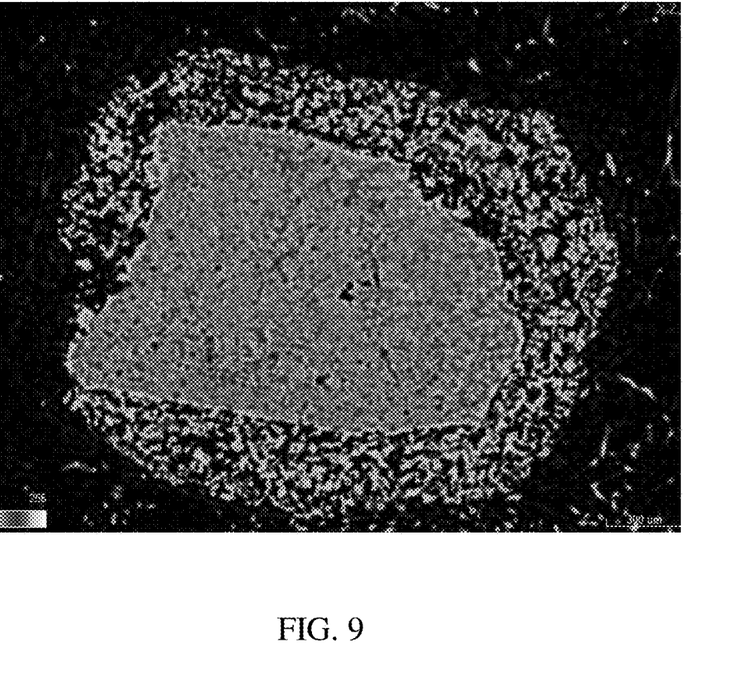
FIG. 9 shows picture of the granules of the present two-layer fertilizer. Number on color bar is a qualitative indicator of density. Higher number indicates higher density. The granule core and surrounding coating can be seen in this image, represented by different colors.

FIG. 9 shows the picture of the two-layer fertilizer granule of the present disclosure. The number on color bar is a qualitative indicator of density. Higher number indicates higher density. The granule core and surrounding coating can be seen in this image, represented by different colors.

The smaller size of the granule (core) had a similar fracture pressure as the normal market urea, but the dissolution rate was more than 80% lower. For the two-layer granules, the granule with corn starch hydrogel binder in the second layer showed the best performance. The fracture pressure is roughly 28% less than the normal market urea; however, the dissolution rate is 80% lower. The dissolution pattern showed that this granule released nutrients slowly at the beginning. As the added hydrogel has a better holding capacity in the outer layer, the initial nutrient release rate is slow. Then, once the outer layer is fully saturated, the nutrient from the second layer with a starch binder releases the nutrient.

Those skilled in the art will recognize that numerous modifications can be made to the specific implementations described above. The implementations should not be limited to the particular limitations described. Other implementations may be possible.

We claim:

1. A controlled release fertilizer granular composition, wherein the controlled release fertilizer granular composition comprises:
    a core comprising a water-soluble plant nutrient and a binding material to bind the water-soluble plant nutrient; and
    a coating layer consisting essentially of an agglomeration of the water-soluble plant nutrient and a hydrogel,
    wherein a closed porosity of the coating layer is higher than a closed porosity of the core,
    wherein the core has a diameter of 1.5-4.0 mm, and a closed porosity of 0.05-3%,
    wherein the coating layer has a thickness of 0.5-2.0 mm, and a closed porosity of 0.1-5%,
    wherein the core is completely coated by the coating layer, and wherein the fertilizer granular composition is capable of releasing the needed amount of nutrients to a plant based on plant growth stages.

2. The controlled release fertilizer granular composition of claim 1, wherein the water-soluble plant nutrient comprises urea.

3. The controlled release fertilizer granular composition of claim 1, wherein the binding material and the hydrogel comprise naturally occurring materials or derivatives made from naturally occurring materials.

4. The controlled release fertilizer granular composition of claim 1, wherein the binding material is starch, celluloses, gum, or any combination thereof.

5. The controlled release fertilizer granular composition of claim 1, wherein the binding material is corn starch, potato starch, tapioca starch, microcrystalline cellulose, hydroxypropylmethyl cellulose, guar gum, gum Arabic, or any combination thereof.

6. The controlled release fertilizer granular composition of claim 1, wherein the hydrogel is starch-based hydrogel, cellulose-based hydrogel, plant and/or animal protein based hydrogel, or any combination thereof.

7. The controlled release fertilizer granular composition of claim 1, wherein the core comprises 1-15 wt. % of binding material and 85-99 wt. % of water-soluble plant nutrient, the coating layer comprised 1-5 wt. % of hydrogel.

8. The controlled release fertilizer granular composition of claim 1, wherein the water-soluble plant nutrient comprises urea, the binding material for the core comprises corn starch, the hydrogel for the coating layer is corn starch hydrogel, the core has a thickness of 2.5-3.5 mm and a closed porosity of 0.05-3%, and the coating layer has a thickness of 1.35-1.5 mm and a closed porosity of 0.1-5%.

\* \* \* \* \*